US008850498B1

(12) United States Patent
Roach et al.

(10) Patent No.: US 8,850,498 B1
(45) Date of Patent: Sep. 30, 2014

(54) MEDIA ADAPTIVE DISTRIBUTION SYSTEM AND METHOD (75) Inventors: Wayne C. Roach, Bowie, MD (US); Gil R. Pascal, Frederick, MD (US)

(73) Assignee: Collideo LLC, Moorestown, NJ (US)

( * ) Notice: Subject to any disclaimer, the term of this patent is extended or adjusted under 35 U.S.C. 154(b) by 1243 days.

(21) Appl. No.: 12/467,767

(22) Filed: May 18, 2009

Related U.S. Application Data (60) Provisional application No. 61/053,928, filed on May 16, 2008.

(51) Int. Cl.
H04N 7/173 (2011.01)
(52) U.S. Cl.
USPC ............. 725/91; 380/201; 380/202; 380/210; 380/217; 375/240.27
(58) Field of Classification Search
CPC ............. H04N 21/234309; H04N 21/234336; H04N 19/00472; H04N 19/00103; H04N 29/06027; H04N 19/00733; H04N 19/00266; H04N 19/00175; H04N 19/00781; H04N 19/0006; H04N 19/00945
USPC ............... 725/87, 91, 98, 100, 109, 110, 114, 725/116, 117, 118, 138; 375/240.01–240.27; 380/201, 202, 380/210, 217
See application file for complete search history.

(56) References Cited

U.S. PATENT DOCUMENTS

| | | | |
|---|---|---|---|
| 5,978,855 A | 11/1999 | Metz | |
| 7,003,793 B2 | 2/2006 | Hwang et al. | |
| 7,191,215 B2 | 3/2007 | Ganesan et al. | |
| 7,320,069 B1* | 1/2008 | Sundharraj et al. | 713/153 |
| 2002/0159457 A1* | 10/2002 | Zhang et al. | 370/391 |
| 2004/0184534 A1* | 9/2004 | Wang | 375/240.03 |
| 2005/0005025 A1 | 1/2005 | Harville | |
| 2005/0144468 A1 | 6/2005 | Northcutt | |
| 2005/0204067 A1 | 9/2005 | Ji | |
| 2006/0062426 A1* | 3/2006 | Levy et al. | 382/100 |
| 2006/0095401 A1* | 5/2006 | Krikorian et al. | 707/1 |
| 2006/0117371 A1* | 6/2006 | Margulis | 725/131 |
| 2006/0173789 A1 | 8/2006 | Baumert | |
| 2006/0209745 A1* | 9/2006 | MacMullan et al. | 370/328 |
| 2006/0224765 A1 | 10/2006 | Katsumata | |
| 2006/0274895 A1 | 12/2006 | Ji | |
| 2007/0041585 A1 | 2/2007 | Ji | |
| 2007/0100771 A1 | 5/2007 | Eckleder | |

(Continued)

OTHER PUBLICATIONS

Park et al. "Contents Distribution system based on MPEG-4 ISMACryp in IP Set-top Box Environments"; May 2006.; IEEE.*

(Continued)

Primary Examiner — Brian T Pendleton
Assistant Examiner — Alan Luong
(74) Attorney, Agent, or Firm — Schnader Harrison Segal & Lewis LLP (57) ABSTRACT A system and method for distributing digital video contents that provides the content owner, service provider, video distributors and consumers with a method for secure delivery of digital media content by encryption using a portable digital video storage and distribution device that includes a decoder and, wired, USB and HDMI wireless interfaces to transmit digital contents for viewing on a television, laptop/personal computer or other portable viewing devices. The system consists of a remote content-distribution management platform that provides end-to-end protection and a portable digital video storage and distribution device using broadband wireless technologies such as 802.11n and ultra wideband (UWB).

17 Claims, 2 Drawing Sheets

(56) References Cited

U.S. PATENT DOCUMENTS

| | | | |
|---|---|---|---|
| 2007/0133673 A1 | 6/2007 | Imaizumi | |
| 2007/0157241 A1* | 7/2007 | Walker | 725/46 |
| 2007/0206673 A1 | 9/2007 | Cipolli | |
| 2007/0226365 A1* | 9/2007 | Hildreth et al. | 709/231 |
| 2008/0031448 A1 | 2/2008 | Dang | |
| 2008/0060038 A1 | 3/2008 | Stallings | |
| 2008/0299912 A1 | 12/2008 | Unger | |
| 2008/0304563 A1* | 12/2008 | Schoenblum | 375/240.03 |
| 2009/0097551 A1* | 4/2009 | Zhang et al. | 375/240.03 |

OTHER PUBLICATIONS

Contents distribution system based on MPEG-4 ISMACryp in IP set-top box environments Sang-ho Park; Jaewoon Jeong; Taekyoung Kwon; Consumer Electronics, IEEE Transactions on vol. 52, Issue 2, May 2006 pp. 660-668.

A 60 GHz wireless network for enabling uncompressed video communication Singh, H.; Jisung Oh; Changyeul Kweon; Xiangping Qin; Huai-Rong Shao; Chiu Ngo; Communications Magazine, IEEE vol. 46, Issue 12, Dec. 2008 pp. 71-78 Digital Object Identifier 10.1109/MCOM.2008.4689210.

XML-driven Bitrate Adaptation of SVC Bitstreams Paridaens, T.; De Schrijver, D.; De Neve, W.; Van de Walle, R.; Image Analysis for Multimedia Interactive Services, 2007. WIAMIS '07. Eighth International Workshop on Jun. 6-8, 2007 pp. 49-49 Digital Object Identifier 10.1109/WIAMIS.2007.93.

* cited by examiner

FIG. 2

MEDIA ADAPTIVE DISTRIBUTION SYSTEM AND METHOD

This application is based on, and claims priority to, provisional application Ser. No. 61/053,928, having a filing date of May 16, 2008, entitled Media Adaptive Distribution System and Method.

FIELD OF THE INVENTION

The invention relates generally to the digital media entertainment industry, specifically the secure distribution of digital media across a network to a home network user for secure playout either standalone, wired or wirelessly through a viewing device such as a Personal Video On Demand Device (PVOD).

BACKGROUND OF THE INVENTION

Presently, the digital media entertainment industry is buoyed by an ongoing fierce competition among the premier globally dispersed media distribution concerns. This competition is a result of the need to gain a competitive edge while at the same time establishing a viable, secure and profitable business model to serve an ever entertainment-hungry public. Many corporations sought to be ahead of the curve through the establishment of fiber-based broadband networks across the spectrum. Today, approximately 80% of households receive their content from cable or satellite providers. Entertainment is rapidly moving toward non-fixed-schedule on-demand, such as, but not limited to, cable, satellite, Internet Protocol Television (IPTV), and time-shift viewing such as but not limited to personal video recorders or new age devices. The average in-home entertainment platform is evolving into a high quality media center punctuated with cable or fiber optic services (FIOS) legacy or modern Internet Protocol (IP) set top boxes or personal computers optimized for high quality media content playback serving as the central media server. The result of these improvements in the distribution architecture is the widespread availability of broadband connectivity, and as expected an increased consumer need for high quality and readily available high-quality content. There is a need to improve the quality and consistency of distribution in alignment with the advances in media distribution technologies. These advances enabled emerging distribution houses to take advantage of the proliferation of the Internet and advances in media compression to provide better service quality at lower costs.

With the advent of these advance compression technologies, there remains however some stubborn challenges to the protection of the distribution infrastructure. The protection of media from piracy therefore, still remains one of the biggest "headaches" to the media distribution industry. The entertainment market is therefore "primed" for a distribution platform that offers the best advantages to the industries of impact namely; consumer electronics, service providers, content owners and information technology. Home entertainment has also seen extensive enhancements through the creative advances of the electronic industry. Leading companies from the consumer electronics, service providers, content owners and information technology industries are most impacted by this emerging revolution that is primed to deliver enhanced entertainment options to the consumer experience. The entertainment industry has adjusted to these advances through the availability of content formatted for better quality and improved viewing capabilities. The standard media formatted for high-definition, high quality distribution becomes available at a much faster "clip" than previously imagined. Video-on-demand is common on all major distribution platforms as a subscribed option and is formatted to be delivered to high definition television (HDTV), personal computers and standard television endpoints.

Distribution of the aforementioned are consequently facilitated either through the cable or digital satellite distributions network(s), the Internet or through the movie rental houses option.

The adoption of new compression technologies and new modes of distribution is still however in its infancy stage and as a result, some reference areas for distribution are still being affected. For instance, the movie industry strives to be a valid in-home network player but for the absence of clear secure digital rights management standards and innovations. Competition among the video rental houses is also at its peak currently because of the need for a more profitable and secure distribution model of reference.

While the content provider and service provider industries have benefited immensely from this boom in demand, there still lies an opportunity for an alternatively more secure, advanced storage and cost effective media distribution method. The solution envisaged is driven by the vast advances in media compression technologies, enhanced digital rights management security technologies and the need for flexible programming in choosing video entertainment.

Content owners and service providers have long established a sincere demand for a robustly secure distribution platform to protect their assets. Content owners whose assets include games, movies and other forms of digital entertainment are exposed to great losses while reluctantly choosing service providers on an insecure platform at the highest risks to make content available online. Industry experts have estimated losses in revenue due to piracy to be $6 Billion USD yearly. There is a need for providing end-to-end secured home entertainment products and services. In complete cognizance of these challenges, there is a need for a secure, high quality distribution of high definition, enhanced media assets to portable viewing devices.

SUMMARY OF THE INVENTION

Embodiments of the invention concern distribution of media contents from a remote source to portable personal viewing devices. In particular, the invention relates to distributing media-on-demand (MOD) contents through a network such as the Internet for an end user to securely stream either wired, wireless or direct to his desired in-home playout location. The MOD content is encrypted and encoded end-to-end from the remote source to the end user's location. In an illustrative embodiment to which the invention pertains, the incoming media stream is processed at the end user's location in a portable contents distribution apparatus to be either wired or wirelessly transmitted in high definition to be viewed on a viewing device such as, but not limited to, a personal computer, a laptop, a portable digital player or a television.

Embodiments of the invention is directed to a portable media-on-demand (MOD) contents distribution apparatus, which includes a media input component for receiving and processing an incoming media stream from a remote distribution source. The media input component includes a media-input interface adaptable to communicate with and to receive the incoming media stream from the remote distribution source and a media-input processor configured to verify user access information for the secure delivery of the incoming media stream. It also includes a transcoding component for processing the incoming media stream received by the media input component configured to determine the bit rate of the media stream and to decompress the incoming media stream, thereby generating a processed media stream. A media output component, and a communication processor coupled to the media input component and the transcoding component are also included. The communications processor is configured to manipulate the processed media stream to produce a transmission-ready stream. A media-output interface adaptable to communicate with the media output component is coupled to the communications processor. The media output component streams transmission-ready stream to the media output device for transmitting to a viewing device. The system also includes a device distribution management component in communication with the transcoding component for managing the processed media stream. The device distribution management component includes a device distribution management platform; and computer-readable medium having stored therein data representing the processed media stream; and a processor in communication with the computer-readable medium. The processor stores therein computer-executable code to manage distribution of the processed media stream.

DESCRIPTION OF THE DRAWINGS

The invention is best understood from the following detailed description when read with the accompanying drawings.

DETAILED DESCRIPTION OF THE INVENTION

Illustrative embodiments of the invention include systems and methods for distributing digital video content that provides the content owner, service provider, video distributors and consumers with a method for secure delivery of digital media contents by encryption using a portable digital video storage and distribution device that includes a decoder and a HDMI (High-Definition Multimedia Interface) wireless interface to transmit digital contents wirelessly, a standard HDMI interface and a universal serial bus (USB) interface for viewing content on viewing device such as, but not limited to a High Definition (HD) capable television, laptop/personal computer or other portable viewing devices. The system consists of a remote content-distribution management platform that provides end-to-end protection (e.g. ISMA Encryption and Authentication (ISMACryp)) and a portable digital video storage and distribution device using broadband wireless technologies such as 802.11n and ultra wideband (UWB).

Embodiments of the invention provide content owners, service providers, media distributors and consumers with a method for secure delivery of media assets. Embodiments of the invention may serve as a robust and secure storage device for the highest quality media content such as a library of themed movies from content distributors or general releases from content providers. Embodiments of the invention introduce an adaptive connectivity for both intelligent connectivity and intelligent media content transcoding.

Figure 1:
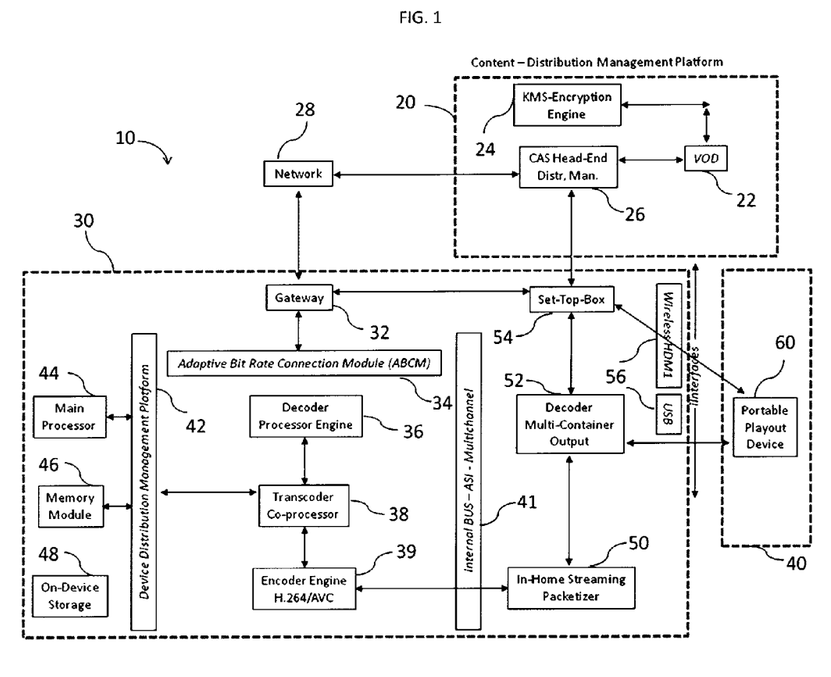
FIG. 1 is a block diagram of the media-on-demand (MOD) contents distribution system according to an illustrative embodiment of the invention.

Embodiments of the invention encompass apparatuses, systems and methods for distribution of media content over an adaptive connection platform. FIG. 1 shows a block diagram of the media adaptive distribution system 10 according to an illustrative embodiment of the invention. The system comprises three main components, which are: (1) a contents-distribution management platform 20, (2) a portable user-end content-distribution apparatus 30, and (3) a portable playout or viewing system 40.

In the illustrative embodiment of the invention, a contents-distribution management platform 20 comprises a conditional subscription access head-end management system 26, an encryption engine 24, and a remote content storage 22 as a source for storing media-on-demand contents.

The contents-distribution management platform 20 provides an interactive platform for the user at the end-user location to select a desired media stored at the remote contents source, such as a video-on-demand. Upon the selection of the desired media asset, for example, a video file, a request for processing the media asset selection is communicated to the processor to retrieve the selected media asset at the remote contents storage source. After the selected media asset is retrieved, the media asset is encoded and encrypted via the encryption engine 24 and the conditional subscription access head-end management system 26, respectively.

The conditional subscription access head-end management system 26 is coupled to the encryption engine 24, an encoder processor engine and a processor to provide secure access to the media stream to be sent to the end user via a network 28 such as the Internet. The conditional subscription access system includes an enhanced digital rights management (DRM) module to prevent maliciously accessing unprotected media assets. In addition, unauthorized access to the assets stored on the device for copying purposes would also be prevented through the guarantees of the inclusive digital rights management (DRM) system. In an illustrative embodiment, an encryption method is used to enable secure distribution, identification and tracking of digital contents. Transport stream data is then encapsulated and transmitted over an IP network.

For a given media stream to be compressed and encrypted for transmission to the user end, a suitable encryption algorithm and compression method are used. A variety of encryption algorithms with different cryptographic media encodings and protocols may be used to encrypt the media file. Different techniques of discretizing components of the media files can also be used in the encryption. In the illustrative embodiment, key frames of the media file are selected to be encrypted so that the media data can be sent efficiently to best utilize computational resources. The encryption platform embodies the open platform that allows efficient flexibility in securely managing content, thus enabling the ultimate experience for consumers and content owners. The goal is to protect content in its distribution life cycle.

In the illustrative embodiment, ISMACryp is used as the encryption algorithm, which provides complete end-to-end protection with access units being protected by the content creator and being decrypted only right before decoding. The Receiver architecture includes interfaces to Key/License Management (KEY MGT), a real-time streaming protocol (RTSP) control interface, and ISMACryp, the cryptographic services for media data. The ISMACryp Receiver can decrypt, authenticate, and check the integrity of encrypted media data. In the ISMACryp environment, a media stream may be mastered into a file or streamed directly from an encoding application to a network. In the illustrative embodiment, encryption occurs prior to transport, although message authentication is performed at the transport layer.

At the user's end, a stream may be received into a file, such as a personal recorder at a player or cache server, or directly to a decoder. ISMACryp transforms are applied at the arcs that emanate from the encoder; decryption occurs at the arcs that terminate at the decoder; message authentication transforms are applied at the Secure Real-time Transport Protocol (SRTP) sender and receiver. ISMACryp supports the replacement of its encryption and message-authentication (integrity) transforms. It is possible to replace the ISMACryp default encryption or message authentication transform with different ones. Existing transforms may be augmented for media authentication to be added to ISMACryp without necessarily replacing message authentication.

The ISMACryp modular design relies on external standards where appropriate, and is therefore suitable for the greatest variety of network environments. Thus, ISMACryp uses SRTP for message authentication of real-time media packets [RFC3711]. A modular design also permits use of a variety of key management and key establishment systems.

In addition to message authentication, there is also media authentication. Authentication of the rights holder that creates or publishes a content work—and validation of the integrity of that work—can be an important function for many applications. Typically, digests from hash functions will suffice for the integrity check, and digital signatures serve to authenticate the creator of the digest or catalog of published works. This solution is efficient for files that are reliably delivered and for which a single hash of the contents is feasible. Such a hash cannot be computed when parts of the file are streamed over a lossy channel. Whereas public-key cryptography (PKC) is suitable to authenticate media data in files, this is inefficient for packet data: Practical security systems generally do not use asymmetric cryptography for packets owing to the excessive per-packet overhead of digital signatures or public-key encryption. The packet-size and computation overhead are worse for media frames since there are often multiple frames to a packet. There are, however, two methods more efficient than PKC to authenticate stored and streamed media data independently of the message. The first method is to authenticate each media frame using symmetric keys. Use of a message authentication code (MAC) is arguably feasible for large media frames, but these frames may be fragmented across transport packets, thus causing additional complications. In fact, even symmetric authentication techniques are generally infeasible for small media frames since a message authentication code (MAC) can add 10 or more bytes to the length of each media frame. This technique has orders of magnitude less overhead than PKC and is not excessive for large (~500 byte) video frames. But it is excessive for small frames and low bit-rate audio and video data. The second method avoids the problem of authenticating fragments of media frames by pre-assigning media data into packet payloads, which are authenticated independently of the transport packet. This pre-assignment assumes that the size of the transport-packet payload is fixed prior to the time of transport.

Even the second choice, which has much less overhead than the first, usually doubles the amount of MAC data in each transport packet. This doubling is unavoidable if both message authentication and media authentication are desired. Of the two, message authentication is chosen as more important for several reasons. First, the receiver must trust the sender to have rights to disseminate the media and this trust relationship is realized in message authentication. Second, the authentication of the file creator can be no better than that of the sender whom the creator has authorized to disseminate the work. Third, it is not necessarily the receiver's responsibility to ensure that what the sender sends is exactly what the file creator authorized it to send. Finally, the sender may have rights to alter the media in various ways. Thus, media authentication is redundant to message authentication for many practical applications. The preferred packet design uses SRTP message authentication only and does not support media authentication independent of the SRTP message.

The ISMACryp file format transformation supports the encryption of files either for local playback (including file download) or prior to hinting for streaming. The transformation is self-contained; all the information needed to either play the file, or hint it for streaming (including generating SDP information) is in the file. This does not mean, of course, that the file contains, for example, all the keys; but it does mean that enough information may be included to identify the Key Management System (KMS) used and to enable a client to contact it and acquire the correct set of keys. The file transformation involves: (1) transforming the media samples themselves (encrypting them); and (2) transforming the description of the media samples, both to document the transformation of the media samples, and to avoid the encrypted samples being read as if they were in the clear.

The file may be optionally hinted, and the extra signaling must be generated in the hint tracks.

In its deployment, the promotion of protection against leaks in the distribution chain is its main boast. In addition, it allows storage of the received streams for later consumption in a standardized format while still being encrypted.

In this illustrative embodiment, the sign bits of discrete cosine transform (DCT) coefficients and motion vectors from the video sequence are extracted and encrypted using the AES-128 CTR cryptosystem and then restored back to their original position in the encrypted form. It specifies cryptographic metadata for each access unit, identifying descriptive properties like selective encryption, key rotation and random-access while being unsusceptible to packet loss. In RTP the cryptographic metadata is added to the payload specific AU headers, specified therein. It contains a partial IV for AES128-CTR, a flag whether the following access unit is encrypted and a variable length field that identifies the used key.

Key frames are the significant ones that summarize the substance of the video scene. Video scenes for compression purposes are formatted and textured based on scene information including color and motion references to determine the structure of each frames (I-Frame, P-Frame and B-Frame). DCT information in the compression process is a subset of the macroblock lower level information used as a critical reference to each frame. The crucial part of the process is to select the key frames to be encrypted to maximize computing resources.

The most significant coefficients from either the final steps or the intermediate steps of compression are selected and are encrypted with Advanced Encryption Standard (AES). This selection is done in small segments for integrity protection purposes by retaining the most important significant bits as a most critical key in the final restructuring of the impacted data stream. This may also make the likelihood of any attacker recovering any information from the coefficient nearly impossible. The structure of standard MPEG streams use 8×8 blocks of DCT, Huffman Coding and RLC (Run-length coding. The I-Frames in the video streams are used in the encryption process. The key to an effective selective encryption will then be to ensure that highly sensitive segments of the I-Frame coefficients are encrypted while at the same time maintain a light encryption structure by minimizing the selection of some of the DCT bits that comprises the I-Frame macroblocks. Thus the selection of the least amount of the most significant DCT bits will drastically affect the video stream. Consequently, a method to apply start codes to the decoding process based on these selective DCT bits will provide a secure structure to protect the integrity of the video file.

The method of selecting the critical bit information in the encryption process is performed at the vendor distribution head end. A compressed video stream is broken into sectors. At the top level, the compressed video stream includes a sequence header, groups of pictures (each individual group is denoted as a GOP) and an end sequence. Each GOP comprises a header and a number of pictures (in which these pictures and groups of pictures form a video sequence in the stream). A slice (is a standard for H.264/MPEG-4 AVC, and is similar to an I-Frame) is segmented into a number of macroblocks. The macroblock contains a header and a number of blocks. The blocks are coded and contain different information, for example, ADDR, TYPE etc. Information about DCT coefficients can be determined in each 8×8 block.

Figure 2:
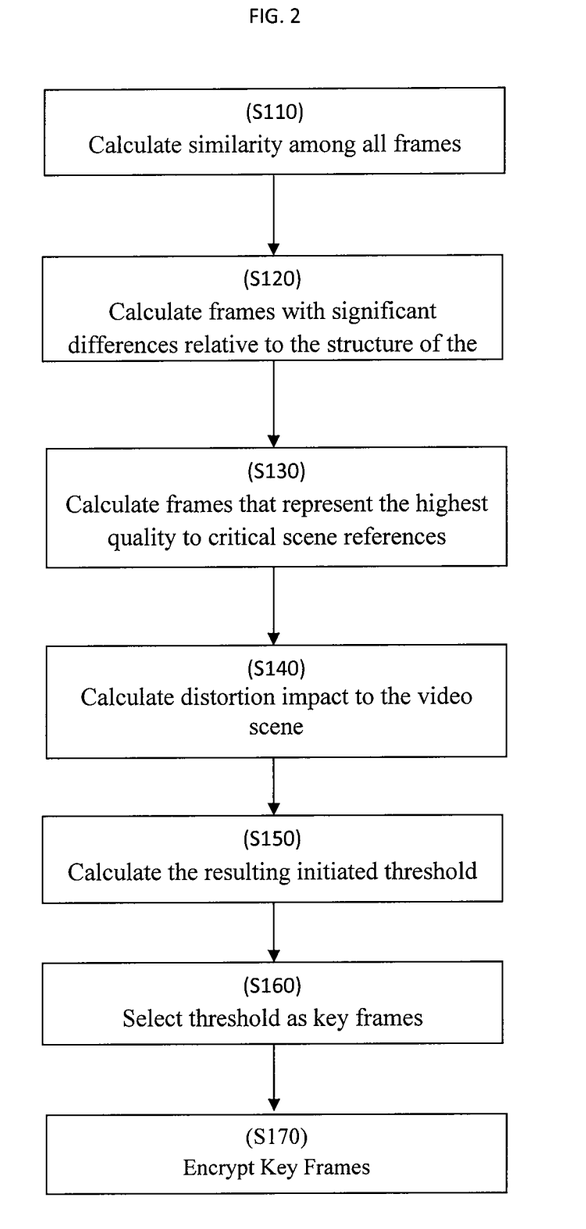
FIG. 2 is a flowchart of an encryption/compression algorithm according to an illustrative embodiment of the invention.

FIG. 2 shows the steps of selecting key frames for encryption, the method includes the steps of first extracting the DCT information (i.e. sign bits of DCT coefficients and motion vectors) from all I-frames to analyze similarity among all the frames in a given video sequence. (S110). DCT information is a subset of the macroblock lower level information in each frame. If these frames bear significant differences relative to the structure of the video sequences, these frames will be flagged in the metadata. (S120). Frames that represent the highest quality to the critical scene reference will then be flagged. (S130). Distortion impact to the video scene is then calculated by evaluating the critical scene reference relevant to the frames with the highly varied DCT values. (S140). The distortion threshold is based on the value of the distortion impact and flagging frames within a percentage of the distortion threshold. (S150). In an illustrative embodiment, a maximum threshold of 10% is used, but the percentage may vary depending on the processor and computation resources. Selecting frames with a distortion threshold exceeding 10% will result in an increase computation time that affects real time efficiency. (S160). Frames that are within the range of the selected thresholds are flagged as key frames for encryption as an encrypted and encoded media stream. (S170).

The encrypted and encoded media stream is then transmitted through to the end user via a network 28, which may be a private or public network as shown in FIG. 1. The public network may include, but is not limited to, the Internet. The private network may include for example, but is not limited to, a personal area network, a local area network, or an intranet. In an illustrative embodiment, industry standard user datagram protocol (UDP)/IP network encapsulation, with real-time transport protocol (RTP) and real-time control protocol (RTCP) encapsulation is be used. A distribution architecture that can transport both at 100-megabits per second (Mbps) (full-duplex) and 1-gigabit per second (Gbps) Ethernet connections and that can process up to 256 individual streams can be used.

In the illustrative embodiment, the portable user-end content-distribution architecture 30 encompasses a complete platform that includes an media input component 32 with a media-input interface and a media-input processor adaptable to receive a media stream from a network gateway, an intelligent network adaptive connection module including a transcoding component, and a radio frequency (RF) remote interface and device for media output 56. It also contains multi-processor capabilities 44, enhanced memory module 46 and storage 48 along with a device management module 42.

The intelligent network adaptive connection module comprises an adaptive media streaming architecture 34, and an adaptive transcoder architecture. The adaptive media streaming architecture provides near real-time, download and playback streaming capability. In an illustrative embodiment, the adaptive media streaming architecture provides 50 Hours of H.264 hard disk drive (HDD) storage, transcoding/transrating and intelligent adaptive network connectivity capabilities. The module has an intelligent connectivity technology that establishes and maintains a connection bit rate relative to the desired high quality playback feature. Once connectivity is initiated between the device and the network 28, an adaptive procedural call is initiated to identify the connection speed spectrum. Illustrative embodiments of the invention negotiate the network connection in the adaptive bit rate connection module 34 to determine the bit rate. The bit rate information is then used to establish the best possible connectivity for expediting a quality link for streaming of high quality video.

The adaptive transcoder architecture provides transcoding capabilities for legacy type media content. It is known in the art that most distribution channels utilize the popular but outdated MPEG2 content as the default for available stored movies and feature film. These movies, in addition to the minimally available high definition movies, consume a lot of bandwidth and download times increase when accessed through the Internet. Illustrative embodiments of the invention may provide optimal download and playback times in addition to the ability to transcode the contents into an appropriate format such as not limited to H.264/AVC for playback on available end-point(s).

In one illustrative embodiment, as shown in FIG. 1, the adaptive transcoder module comprises a decoder processor engine 36, a transcoder co-processor 38 and an encoder engine 39. When the compressed and encrypted video file is sent from the remote distribution source through the network to the end user, the encoded and encrypted video file may be optionally stored on the memory storage of the apparatus to preserve end-to-end protection of the file until the user decides to play it. It may also be played out directly through an available output interface on the device to a portable playout or viewing system 40. If a user elects to play the file, the file is first decrypted to verify user information and whether the user has rights to the file. Then a decryption key is generated upon the aforementioned verification to decrypt the file. The decoder processor engine 36 then converts the file into its original format, for example, MPEG2. If the adaptive bit rate connection module determines that the file may be play out in the original format, the decoded file will bypass the transcoder 38. However, if a different format is needed to view the video file, for example, MPEG4, the transcoder 38 will up-convert the video file to the desired format, for example from MPEG2 to MPEG4. The transcoder 38 is coupled to the memory module 46 so that the format conversion is performed locally in the device. After sending to the transcoder 38, the video stream is sent to the encoder engine 39 to re-encode to a smaller form. The encoder 39 is adaptably connected to the in-home streaming packetizer 50 via the internal BUS 41 to transmit re-encoded video packets to the end user portable playout or viewing device 60 via any of the available interfaces 56.

In a further illustrative embodiment of the invention, surveillance video media data may be input into the portable user-end content-distribution architecture 30 for processing to be played out in the playout device 60.

As shown in FIG. 1, the processed media stream can be sent to playout devices 60 via high speed wireless transmission because of the emerging advances in broadband wireless technologies such as 802.11n and Ultra Wideband (UWB), which enables sustainable bandwidth of more than 100 Mbps over distances ranging beyond 100 feet to be achieved. A varied platform of playout devices located in the end user's home may include, but are not limited to, high definition televisions (HDTVs), personal portable media players, game consoles, laptops and personal computers, which may all be connected to the media output module of the portable user-end content-distribution architecture over a high speed wireless connection. This enables the delivery of processed media streams such as HD video and graphics wirelessly to the deployed playout devices 60.

In an illustrative embodiment, a WWCOM602X Full-HD-264 Codec Chipset is used in the portable user-end content-distribution architecture to support specifically wireless HDMI connectivity to the playout device, which may include game consoles, laptop computers, portable media players, set top boxes, DVD players and DVRs. Other chipsets may also be used by a person skilled in the art. The chipset also embodies WWCOMS Super Low Latency Technology™ (SLL Technology™), which achieves sub 1 ms 1080p60 encode-decode latency. Such "zero" latency performance enables raw video bit rates to continue to outpace available wireless bandwidth in wireless HDMI applications. This chipset supports advanced error resiliency and concealment features that guarantee distortion-free and highest fidelity pictures under the most adverse wireless channel conditions. The chipset also supports channel adaptive bit rate, transrating and trans-sizing control. This allows a wireless HDMI solution to adjust in real-time the video data rate to match available channel bandwidth under any condition, as well as streaming HD content to devices that only handle lower resolutions and frame rates than the source material.

In another illustrative embodiment of the invention, the adaptive transcoder architecture may be designed also to interface with a standard legacy set-top box to provide transcoding capabilities for legacy MPEG-2 content from cable operators into H.264 HD format to be displayed on a portable viewing device 60, such as, but not limited to a digital television, a laptop, a screen with streaming capability or a personal computer. This architecture is adaptable to be connected to the Internet via network providers such as but not limited to standard cable provider, telecommunication company provider or terrestrial provider in-home installation. The adaptive system intervenes with the end user's in-home set top boxes (STBs) 54 either through its legacy connection or standard IP connection to transcode on-demand available media content into H.264 to be played back through the STB decoder to the HD-Television or optimized personal computer. STBs 54 may be connected to a multi-container output module 52, which contains different folders for converting media streams from the STBs 54 file formats as selected by the user.

Aside from encoding, decoding, and transmission over IP networks for real-time, the system also provides advanced networking capabilities, including Forward Error Correction (FEC), thereby providing a platform to address network imperfections.

In an illustrative embodiment, video specific references used may include as an example, but are not limited to: Real-time HD 1080i/720p video; HD video transport data rates; on-board portable storage component with a capacity to accommodate HD content; surveillance camera capable of encoding at various media formats including H.264; surveillance application options being integrated into capabilities; and WW10K and WW20K H.264 HD codec chipset support; video I/O, embedded host and decoder modules; HDMI, DVI, HD-SDI, component, composite and S-Video I/O options; multiple video I/O ports; full-duplex encode and decode; 10/100Base-T Ethernet support; PCI add-on card form factor; stand-alone and PCI add-on card operation modes; complete set of device drivers and application programming interfaces (APIs); and Linux OS support.

The invention includes the methods as described herein, a computer readable medium programmed to carry out the methods and a computer system configured to carry out the methods, including the equivalents of the aforementioned.

The computer system includes a machine readable storage medium containing an executable code; an apparatus having one or more processors; memory coupled to a processor; a machine-readable medium having machine-readable program code; an input device and an output device connected to the processor to wirelessly transmit media files to portable viewing or playout devices.

While the invention has been described by illustrative embodiments, additional advantages and modifications will occur to those skilled in the art. Therefore, the invention in its broader aspects is not limited to specific details shown and described herein. Modifications, for example to the specific architecture or computer specifications may be made without departing from the spirit and scope of the invention. Various embodiments of the invention have been described, each having a different combination of elements. The invention is not limited to the specific embodiments disclosed, and may include different combinations of the disclosed elements. Accordingly, it is intended that the invention not be limited to the specific illustrative embodiments, but be interpreted within the full spirit and scope of the appended claims and their equivalents.

The invention claimed is:

1. A portable media-on-demand (MOD) contents distribution apparatus comprising:
    a media input receiver configured to receive and process an incoming encrypted and encoded media stream from a remote distribution source, the media input receiver comprising:
        a media-input interface adaptable to communicate with and to receive the incoming media stream from the remote distribution source; and
        a media-input processor configured to decompress and verify user access information of the incoming media stream;
    an adaptive transcoder for processing the incoming media stream received by the media input receiver configured to determine the bit rate of the media stream and to decompress the incoming media stream, thereby generating a processed media stream;
    a media output component;
    a communication processor coupled to the media input receiver and the adaptive transcoder, the communications processor being configured to manipulate the processed media stream to produce a transmission-ready stream; and
    a media-output interface adaptable to communicate with the media output component, the media-output interface coupled to the communications processor, the media output component configured to stream transmission-ready stream to a media output device for transmitting to a viewing device; and
    a multi-processor device distribution manager; comprising:
        a device distribution management platform;
        a computer-readable medium having stored therein data representing the processed media stream, wherein the computer-readable medium is in communication with the adaptive transcoder; and
a processor in communication with the computer-readable medium, the processor having stored therein computer-executable code to manage distribution of the processed media stream.

2. The portable media-on-demand contents distribution apparatus of claim 1, wherein the viewing device is portable.

3. The portable media-on-demand contents distribution apparatus of claim 1, wherein the adaptive transcoder comprises:
an adaptive bit rate connection module for determining the appropriate bit rate to generate a processed stream having a second media format adaptable to be viewed on a viewing device from an input stream having a first media format;
a transcoder processor coupled to the adaptive bit rate connection module to generate the processed stream having a second media format;
a decoder processor engine; and
an encoder engine for formatting the processed stream for further transmission.

4. The portable media-on-demand contents distribution apparatus of claim 1, wherein the media output component is a set-top device.

5. The portable media-on-demand contents distribution apparatus of claim 1, wherein the media output component is a portable viewing device.

6. The portable media-on-demand contents distribution apparatus of claim 1, wherein the media output component is a radio-frequency transmitting device coupled to the communications processor, the radio-frequency transmitting device configured to transmit decrypted and decoded digital stream to the media output device.

7. The portable media-on-demand contents distribution apparatus of claim 1 wherein the media output interface is an USB interface.

8. The portable media-on-demand contents distribution apparatus of claim 1 wherein the media output interface is a wireless HDMI interface.

9. A computer-based method of distributing media-on-demand (MOD) contents comprising the steps of:
storing data in a computer readable medium, the data being associated with a media stream having a series of frames and DCT coefficients;
storing executable code in a computer processor linked to the computer readable medium;
generating an encrypted and encoded media stream, in response to a user selecting MOD contents via a user interface platform, by encrypting and encoding the user-selected MOD contents via a conditional access management system in a head-end distribution management component at a remote distribution source by executing the computer code using the computer processor;
transmitting the encrypted and encoded media stream via a network to a portable MOD contents distribution apparatus at the user location;
decoding and decrypting the media stream in a transcoding component of the portable MOD contents distribution apparatus, thereby generating a processed stream capable of being transmitted to a viewing device;
adaptively adjusting the bit rate of the processed stream in the transcoding component of the portable MOD contents distribution apparatus for display on a viewing device;
generating a transmission-ready stream from the processed stream using a communication processor;
packetizing the transmission-ready stream using a streaming packetizer system for transmitting the data packets via a media output device wirelessly; and
transmitting the transmission-ready stream via a media output device wirelessly to a portable viewing device;
wherein generating an encrypted and encoded media stream further comprises:
extracting DCT bits in a plurality of frames in the media stream to analyze similarity among the frames in the media stream wherein the DCT bit further comprises sign bits and motion vectors;
flagging varied-value frames wherein the varied-value frames have DCT values different than the DCT of frames in the media stream;
providing a DCT value of a critical scene reference;
calculating a distortion impact value by comparing the varied DCT value of a varied-value frame with the DCT value of the critical scene reference;
calculating a distortion threshold value from the value of the distortion impact;
selecting key frames for encryption by flagging frames having a distortion impact value below the distortion threshold value; and
encrypting the key frames.

10. The method of claim 9 further comprising the step of:
storing the media stream in a storage module of the portable MOD contents distribution apparatus.

11. The method of claim 9 wherein the network is the Internet.

12. The method of claim 9 further comprising the step of:
communicating the portable MOD contents distribution apparatus with a set-top device to transmit the media stream to the set-top device.

13. The method of claim 9 further comprising the step of watermarking the media stream.

14. A media-on-demand (MOD) contents distribution system comprising:
a remote MOD storage at a remote distribution source;
a contents-distribution manager coupled with the remote MOD storage at a remote distribution source for processing and distributing MOD over a network, the contents-distribution manager comprising:
a user interface platform configured to receive input from user for selecting MOD contents for purchase;
an encryption engine configured to process and encrypt the user-selected media stream at the contents-distribution manager;
an encoder processor engine coupled to the encryption engine for encoding the media stream to generate collectively with the encryption engine, at the contents-distribution manager, a processed media stream adaptable to be transmitted over a network to the user in an encrypted and encoded media stream;
a portable media-on-demand contents distribution apparatus adaptable to receive the encrypted and encoded media stream over a network at the user end further comprising:
a media input receiver for receiving and processing an incoming encrypted and encoded media stream from a remote distribution source, the media input receiver comprising:
a media-input interface adaptable to communicate with and to receive the incoming media stream from the remote distribution source; and
a media-input processor configured to decompress and verify user access information of the incoming media stream;

an adaptive transcoder for processing the incoming media stream received by the media input receiver configured to determine the bit rate of the media stream and to decompress the incoming media stream, thereby generating a processed media stream;
a media output component;
a communication processor coupled to the media input receiver and the adaptive transcoder, the communications processor being configured to manipulate the processed media stream to produce a transmission-ready stream; and
a media-output interface adaptable to communicate with the media output component, the media-output interface coupled to the communications processor, the media output component configured to stream transmission-ready stream to the media output device for transmitting to a viewing device; and
a multi-processor device distribution manager, the multi-processor device distribution manager comprising:
a device distribution management platform;
a computer-readable medium having stored therein data representing the processed media stream, wherein the computer-readable medium is in communication with the adaptive transcoder; and
a processor in communication with the computer-readable medium, the processor having stored therein computer-executable code to manage distribution of the processed media stream; and;
a viewing device adaptable to receive MOD stream from a portable media-on-demand contents distribution apparatus.

15. The media-on-demand contents distribution system of claim 14, wherein the network is the Internet.

16. The media-on-demand contents distribution system of claim 14 further includes a set-top device at the user end.

17. A non-transitory computer readable medium programmed to carry out the method of claim 9.

\* \* \* \* \*